US012769560B2

(12) United States Patent
Vajravel et al.

(10) Patent No.: US 12,769,560 B2
(45) Date of Patent: Oct. 20, 2026

(54) SMART IMAGE PREPARATION FOR SECURE WORKSPACES

(71) Applicant: Dell Products L.P., Round Rock, TX (US)

(72) Inventors: Gokul Thiruchengode Vajravel, Bangalore (IN); Ramanujam Kaniyar Venkatesh, Bangalore (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 656 days.

(21) Appl. No.: 18/164,730

(22) Filed: Feb. 6, 2023

(65) Prior Publication Data

US 2024/0264845 A1 Aug. 8, 2024

(51) Int. Cl.

| | |
|---|---|
| ***G06F 9/445*** | (2018.01) |
| ***G06F 8/60*** | (2018.01) |
| ***G06F 8/61*** | (2018.01) |
| ***G06F 9/455*** | (2018.01) |

(52) U.S. Cl.

CPC ................ *G06F 9/445* (2013.01); *G06F 8/60* (2013.01); *G06F 8/61* (2013.01); *G06F 9/45558* (2013.01); *G06F 2009/45562* (2013.01)

(58) Field of Classification Search

CPC ................. G06F 9/445; G06F 9/45558; G06F 2009/45562; G06F 2009/45587; G06F 8/61; G06F 8/63; G06F 8/60; G06F 9/4557

See application file for complete search history.

(56) References Cited

U.S. PATENT DOCUMENTS

| | | | | |
|---|---|---|---|---|
| 7,356,679 | B1 * | 4/2008 | Le | G06F 16/116 713/1 |
| 8,176,482 | B1 * | 5/2012 | Felix | G06F 8/63 718/1 |
| 8,549,272 | B2 * | 10/2013 | Mullin | G06F 9/45533 718/1 |
| 9,081,747 | B1 * | 7/2015 | Tabieros | G06F 9/4411 |
| 9,519,472 | B2 * | 12/2016 | McLeod | G06F 9/45558 |
| 10,360,011 | B2 * | 7/2019 | Acharya | G06F 9/45558 |

(Continued)

FOREIGN PATENT DOCUMENTS

| | | | | |
|---|---|---|---|---|
| EP | 1724682 A1 | * 11/2006 | | G06F 8/61 |
| EP | 1906302 A1 | * 4/2008 | | G06F 8/63 |
| EP | 1724682 B1 | * 12/2010 | | G06F 8/61 |

OTHER PUBLICATIONS

Sangfor Technologies. What is a Host Operating System? Definition and Explanation (Year: 2023).*

*Primary Examiner* — Lewis A Bullock, Jr.

(74) *Attorney, Agent, or Firm* — Kirton McConkie; Brian Tucker

(57) ABSTRACT

Smart image preparation is provided for secure workspaces. When an administrator requests deployment of an application to a user computing device, a management service can be configured to interface with an orchestrator service to install the application in a virtual machine on an orchestrator and then create an image of the virtual machine. The image can then be provided to the user computing device for deployment to a secure workspace on the user computing device. In this way, an administrator can deploy a secure workspace having an operating system and an application with a single request.

20 Claims, 13 Drawing Sheets

(56) References Cited

U.S. PATENT DOCUMENTS

| | | | | |
|---|---|---|---|---|
| 2005/0198303 | A1* | 9/2005 | Knauerhase | G06F 9/5055 709/227 |
| 2006/0123413 | A1* | 6/2006 | Collet | G06F 8/63 717/174 |
| 2006/0184931 | A1* | 8/2006 | Rochette | G06F 8/61 717/136 |
| 2006/0218544 | A1* | 9/2006 | Chakraborty | G06F 8/63 717/168 |
| 2007/0261056 | A1* | 11/2007 | Iizuka | G06F 8/61 718/100 |
| 2008/0082976 | A1* | 4/2008 | Steinwagner | G06F 8/63 718/1 |
| 2009/0077551 | A1* | 3/2009 | Whiteley | G06F 9/45558 718/1 |
| 2017/0060556 | A1* | 3/2017 | Nigul | G06F 8/65 |
| 2018/0267785 | A1* | 9/2018 | Holman | G06F 9/5072 |
| 2019/0163460 | A1* | 5/2019 | Kludy | G06F 9/00 |
| 2019/0250960 | A1* | 8/2019 | Zhang | G06F 9/5077 |
| 2021/0019163 | A1* | 1/2021 | Taylor | G06F 8/63 |
| 2023/0176839 | A1* | 6/2023 | Stefanov | G06F 8/61 717/140 |
| 2023/0367620 | A1* | 11/2023 | Wilson | G06F 9/44521 |

* cited by examiner

SMART IMAGE PREPARATION FOR SECURE WORKSPACES

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace will be isolated from resources in the external environment and from other applications or services hosted external to the secure workspace.

When a secure workspace is implemented as a virtual machine, the secure workspace will include its own operating system, one or more applications (or workload to be isolated), and any runtime or library that an application requires. Traditionally, an administrator may use a management solution (e.g., Microsoft Endpoint Configuration Manager or Wyse Management Suite) to deploy a secure workspace to a user computing device. In the case of a virtual machine based secure workspace, this deployment would entail deploying an operating system image within the secure workspace, installing each application within the secure workspace including any necessary runtime or library, and then cleaning up and restarting the virtual machine. Oftentimes, different applications require different operating systems or operating system versions (e.g., Windows 10, Windows 11, Ubuntu, CentOS, etc.). Therefore, the process of deploying virtual machine based secure workspaces can be very tedious and error prone.

BRIEF SUMMARY

The present invention extends to systems, methods and computer program products for smart image preparation for secure workspaces. When an administrator requests deployment of an application to a user computing device, a management service can be configured to interface with an orchestrator service to install the application in a virtual machine on an orchestrator and then create an image of the virtual machine. The image can then be provided to the user computing device for deployment to a secure workspace on the user computing device. In this way, an administrator can deploy a secure workspace having an operating system and an application with a single request.

In some embodiments, the present invention is implemented as a method for smart image preparation for secure workspaces. A management service executing on a management server can receive a request to deploy an application to a user computing device. In response to the request, the application can be provided to an orchestrator service executing on an orchestrator. The orchestrator service can create a virtual machine on the orchestrator. The virtual machine can include an operating system. The application can then be installed in the virtual machine. An image of the virtual machine can then be created. The image can include the operating system and the application. The image can be provided to the user computing device for deployment to a secure workspace on the user computing device.

In some embodiments, the present invention can be implemented as computer storage media storing computer executable instructions which when executed implement a method for smart image preparation for secure workspaces. In response to a request to deploy an application on a user computing device, an orchestrator service executing on an orchestrator can be caused to install the application in a virtual machine. An image of the virtual machine can be created. The image can include an operating system installed on the virtual machine and the application. The image can be provided to the user computing device for deployment to a secure workspace on the user computing device.

In some embodiments, the present invention can be implemented as a system that includes a management server having a management service, an orchestrator having an orchestrator service, and one or more user computing devices. The system can be configured to implement a method for smart image preparation for secure workspaces on the one or more user computing devices. The management service can receive a request to deploy an application to a first user computing device of the one or more user computing devices. The management service can cause the orchestrator service to install the application in a virtual machine on the orchestrator. An image of the virtual machine that includes an operating system and the application can be obtained. The image can be provided to the first user computing device to cause the image to be attached to a secure workspace on the first user computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
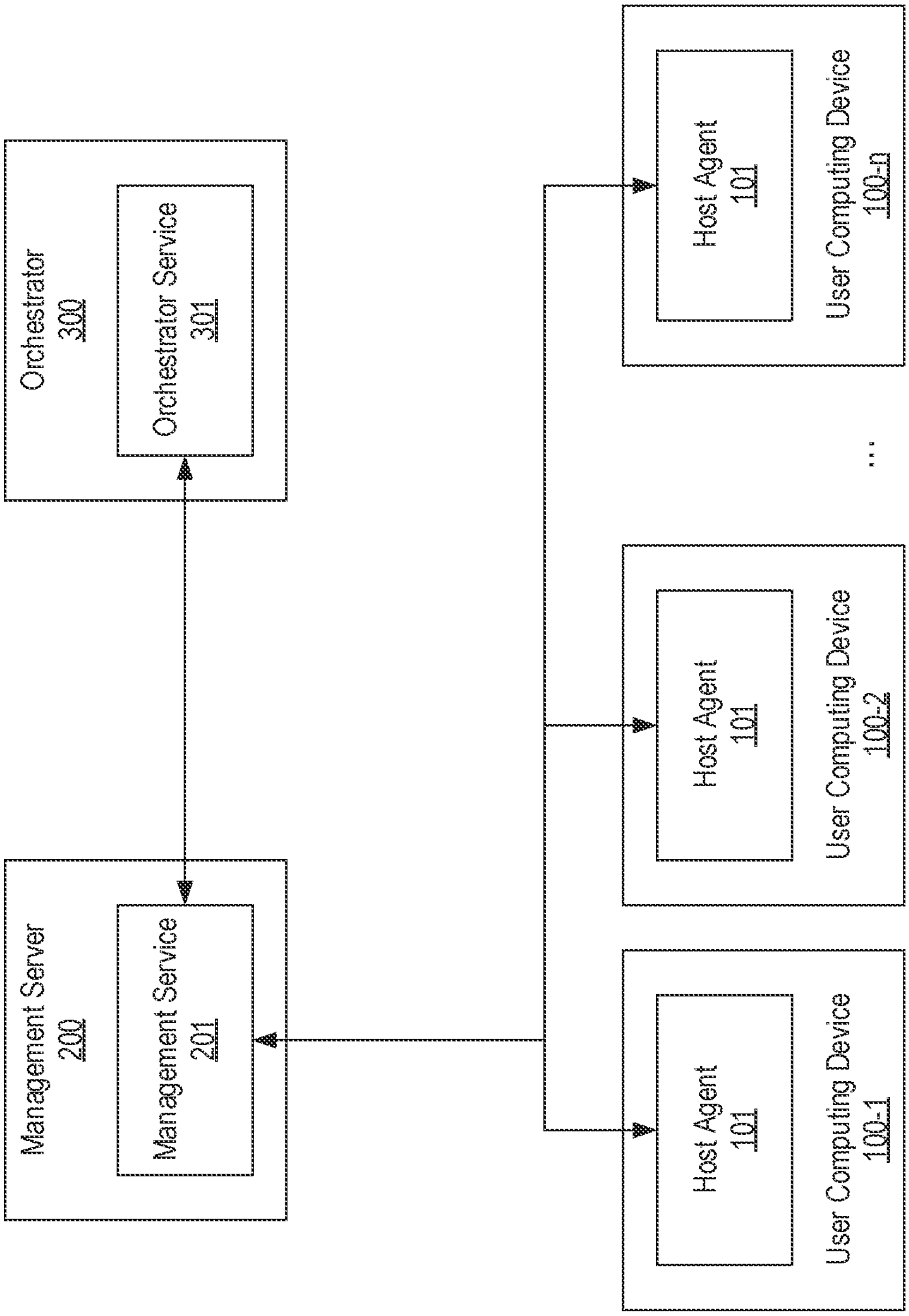
FIG. 1 provides an example of a computing environment in which embodiments of the present invention may be implemented.

FIG. 1 provides an example of a computing environment in which one or more embodiments of the present invention may be implemented. This computing environment includes a number of user computing devices 100-1 through **100-*n* (generally and collectively user computing device(s) 100), a management server 200 which is used to manage user computing devices 100, and an orchestrator 300**.

Each user computing device 100 may include a hypervisor which can allow secure workspaces in the form of virtual machines to be deployed on the user computing device. In this context, a virtual machine should include full virtual machines, micro virtual machines, and other hardware-based containers (e.g., a Windows Sandbox). User computing device 100 can also include a host operating system on which a host agent 101 may be run. Host agent 101 may interface with management server 200 to facilitate the functionality described herein.

Management server 200 may oftentimes be cloud based but could represent any configuration of computing components that can support the functionality described herein. For example, management server 200 could be an on-premises server in some embodiments. Management server 200 may host a management service (or services) 201 that is configured to implement smart image preparation for secure workspaces to be deployed on user computing devices 100 in accordance with embodiments of the present invention.

Orchestrator 300 may also oftentimes be cloud based but could represent any configuration of computing components that can support the functionality described herein. Orchestrator 300 may host an orchestrator service 301 that is configured to interface with management service 201 to support the deployment of secure workspaces on orchestrator 300 and the creation and storage of images of such secure workspaces.

Figure 2A:
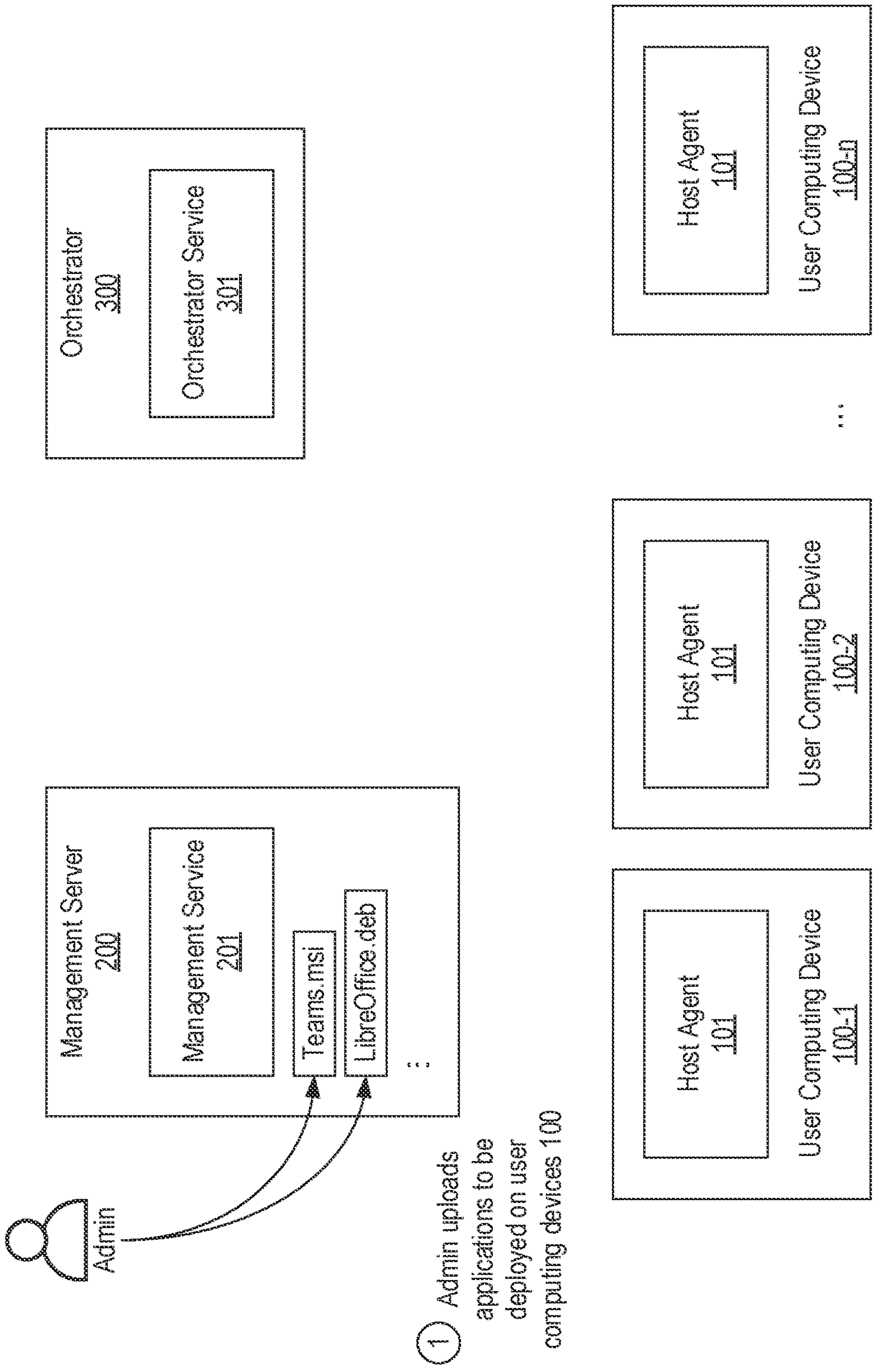
FIGS. 2A-2G provide an example of how smart image preparation for secure workspaces can be implemented in accordance with one or more embodiments of the present invention.

FIGS. 2A-2G provide an example of how smart image preparation for secure workspaces can be implemented in accordance with one or more embodiments of the present invention. Turning to FIG. 2A, in step 1, it is assumed that an administrator has interfaced with management server 200 to upload applications that are intended to be deployed in secure workspaces on user computing devices 100. For example, the administrator could upload Teams.msi which is intended to represent a Microsoft Software Installer for Microsoft Teams and LibreOffice.deb which is intended to represent a Debian Software Package file for LibreOffice. In this context, the term upload can represent any action that makes the applications available to management server 200.

Figure 2B:
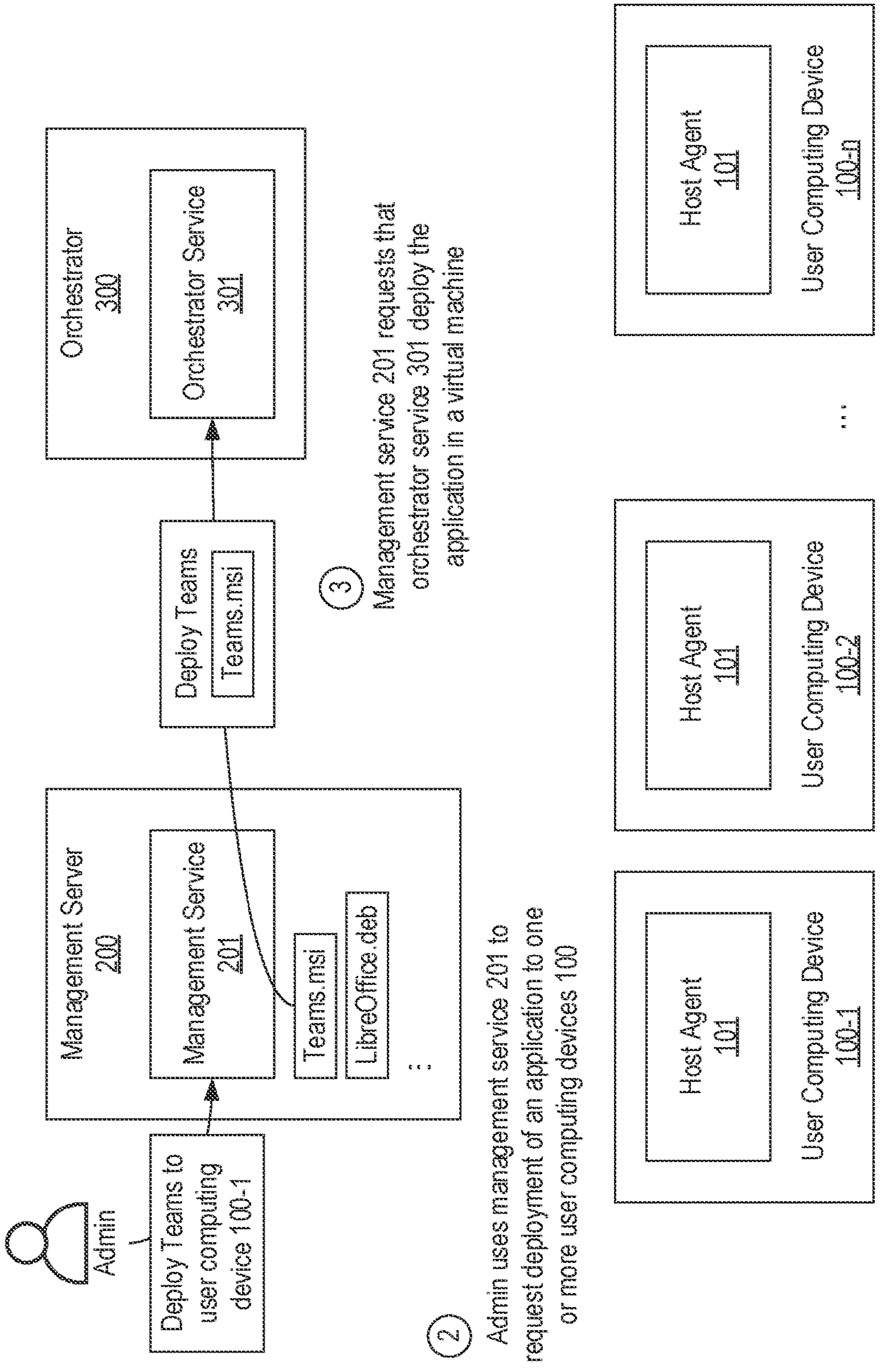

Turning to FIG. 2B, in step 2, the administrator uses management service 201 to request the deployment of an application to one or more of user computing devices 100. For example, the administrator may use a user interface of management service 201 to specify that Microsoft Teams is to be deployed in a secure workspace on user computing device 100-1. In step 3, which may be performed in response to the administrator's request to deploy Teams on user computing device 100-1, management service 201 can request that orchestrator service 301 deploy Microsoft Teams in a virtual machine. For example, management service 201 could send a request containing or referencing Teams.msi and in some embodiments could provide information about the type of virtual machine to be deployed (e.g., a version of an operating system to use).

Figure 2C:
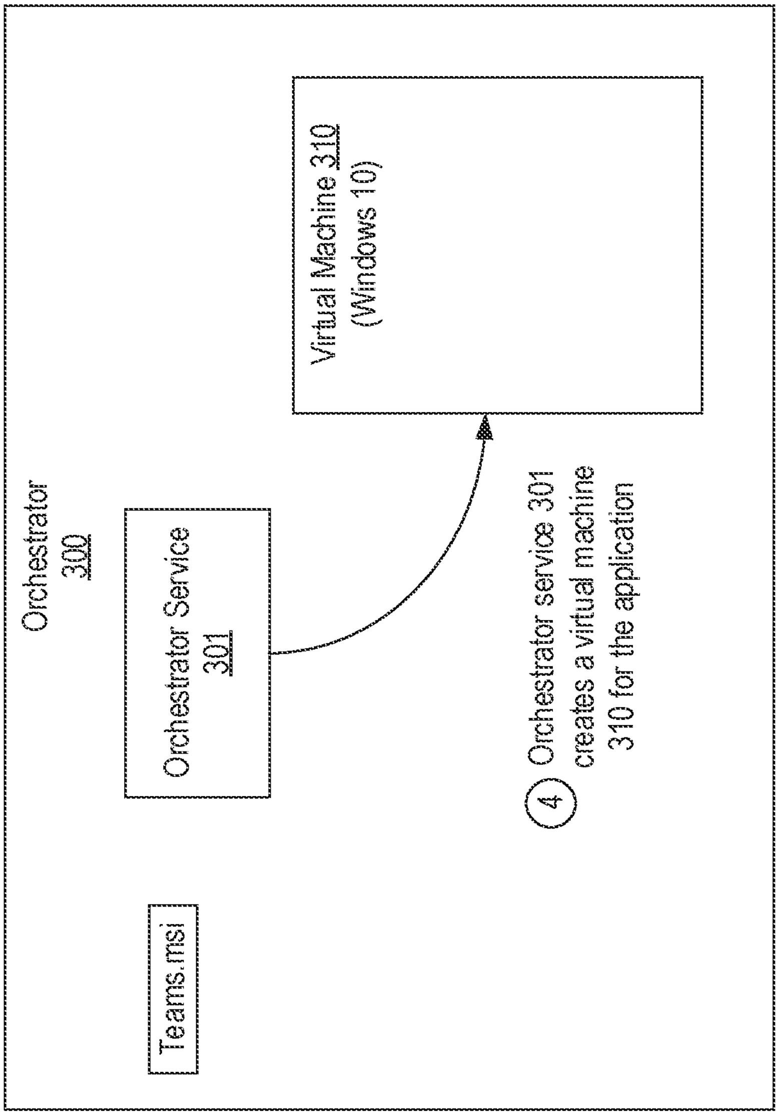

Turning to FIG. 2C, it is now assumed that orchestrator 301 has received the request to deploy Microsoft Teams in a virtual machine and has stored or otherwise has access to Teams.msi. In step 4, orchestrator service 301 can create a virtual machine 310 suitable for the application. In this example, it is assumed that Microsoft Teams is to be run on Windows 10 and therefore orchestrator service 301 has created a virtual machine running Windows 10. As indicated above, management service 201 could specify the type and/or version of the operating system to be installed in the virtual machine. In other embodiments, orchestrator service 301 could infer the type and/or version of the operating system from the installation file received from management service 201 (e.g., Windows for a .msi, Ubuntu for a .deb, etc.). In any case, after step 4, orchestrator 300 will have created a virtual machine that runs an operating system suitable for the application that the administrator is attempting to deploy to at least one of user computing devices 100.

Figure 2D:
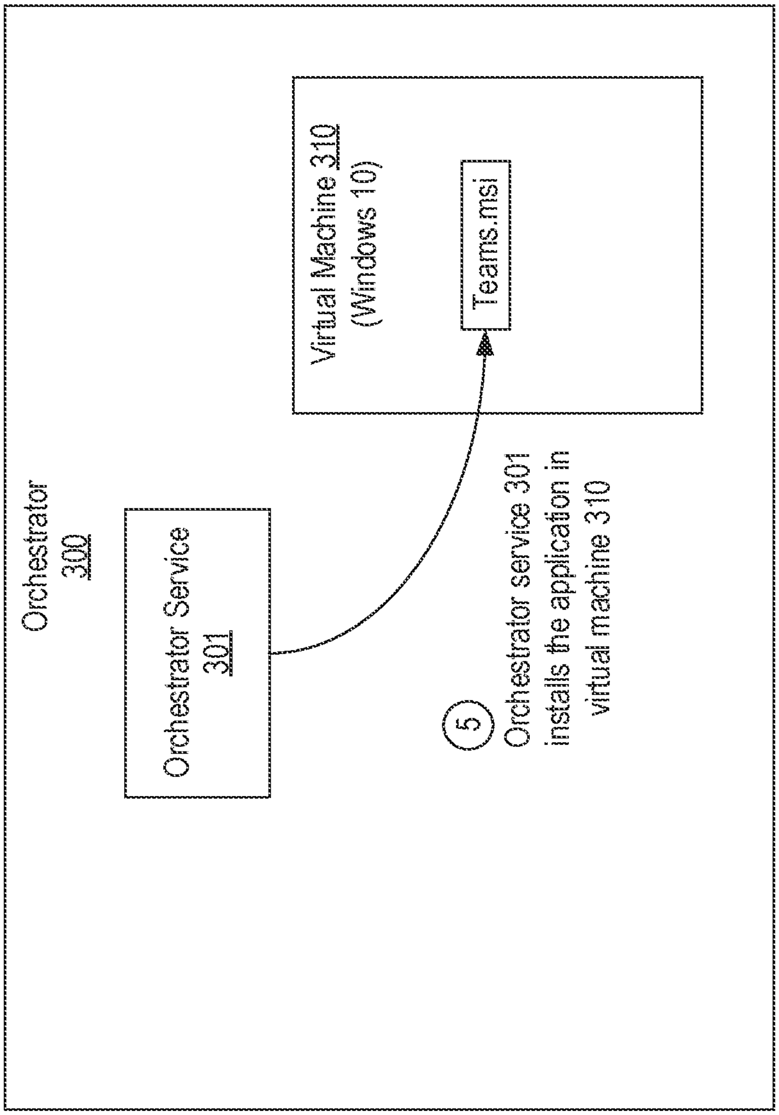

Turning to FIG. 2D, in step 5, orchestrator service 301 can install Microsoft Teams in virtual machine 310. For example, orchestrator service 301 could cause Teams.msi to be launched in virtual machine 310. Step 5 can also encompass any post-installation configurations and/or cleanup that orchestrator service 301 may perform (e.g., to customize Microsoft Teams, to remove unnecessary files, etc.). Notably, in some embodiments, multiple applications could be identified for deployment in the same secure workspace, and in such embodiments, step 5 could encompass installation of each of the multiple applications in virtual machine 310. Accordingly, after step 5, virtual machine 310 will include an operating system and the installed application(s) that the administrator is attempting to deploy to at least one of user computing devices 100.

Figure 2E:
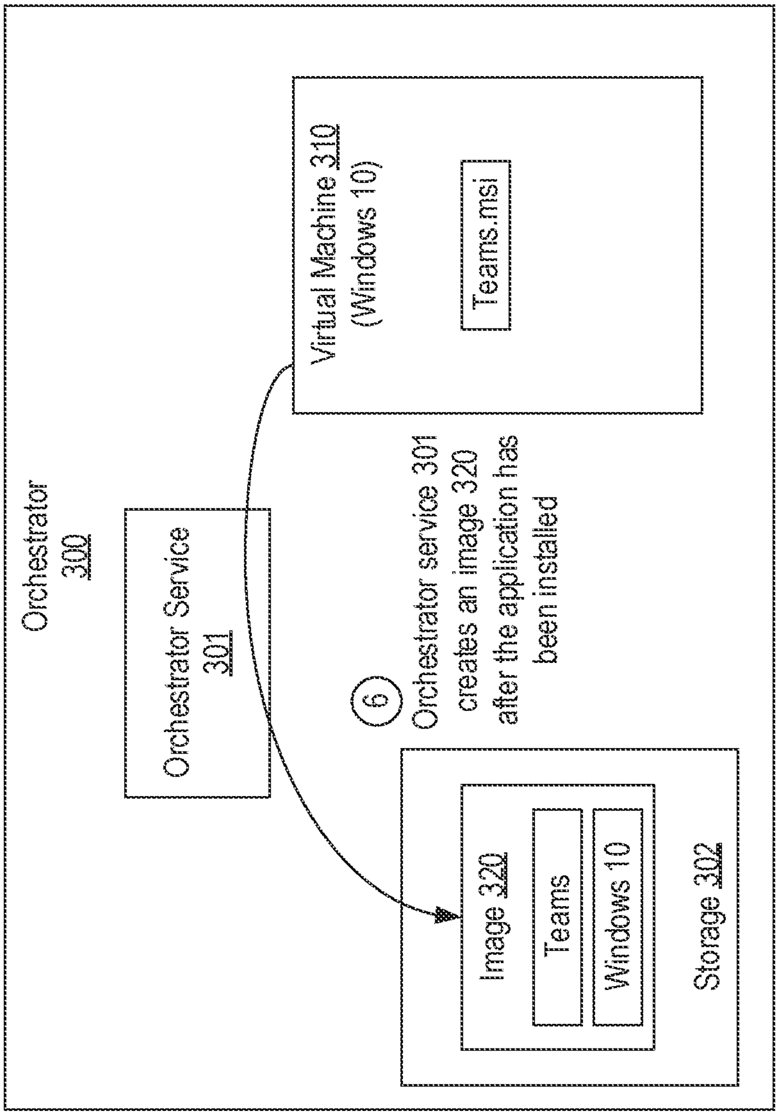

Turning to FIG. 2E, in step 6, orchestrator service 301 may create an image 320 of virtual machine 310 and store image 320 in storage 302. As represented, image 320, which could be a VHDX file, a VMDK file, an ISO file, or any other suitable image file format, includes both the operating system and the installed application, which in this example are Windows 10 and Microsoft Teams. Storage 302 can represent any type of storage media such as a network share or cloud storage.

Figure 2F:
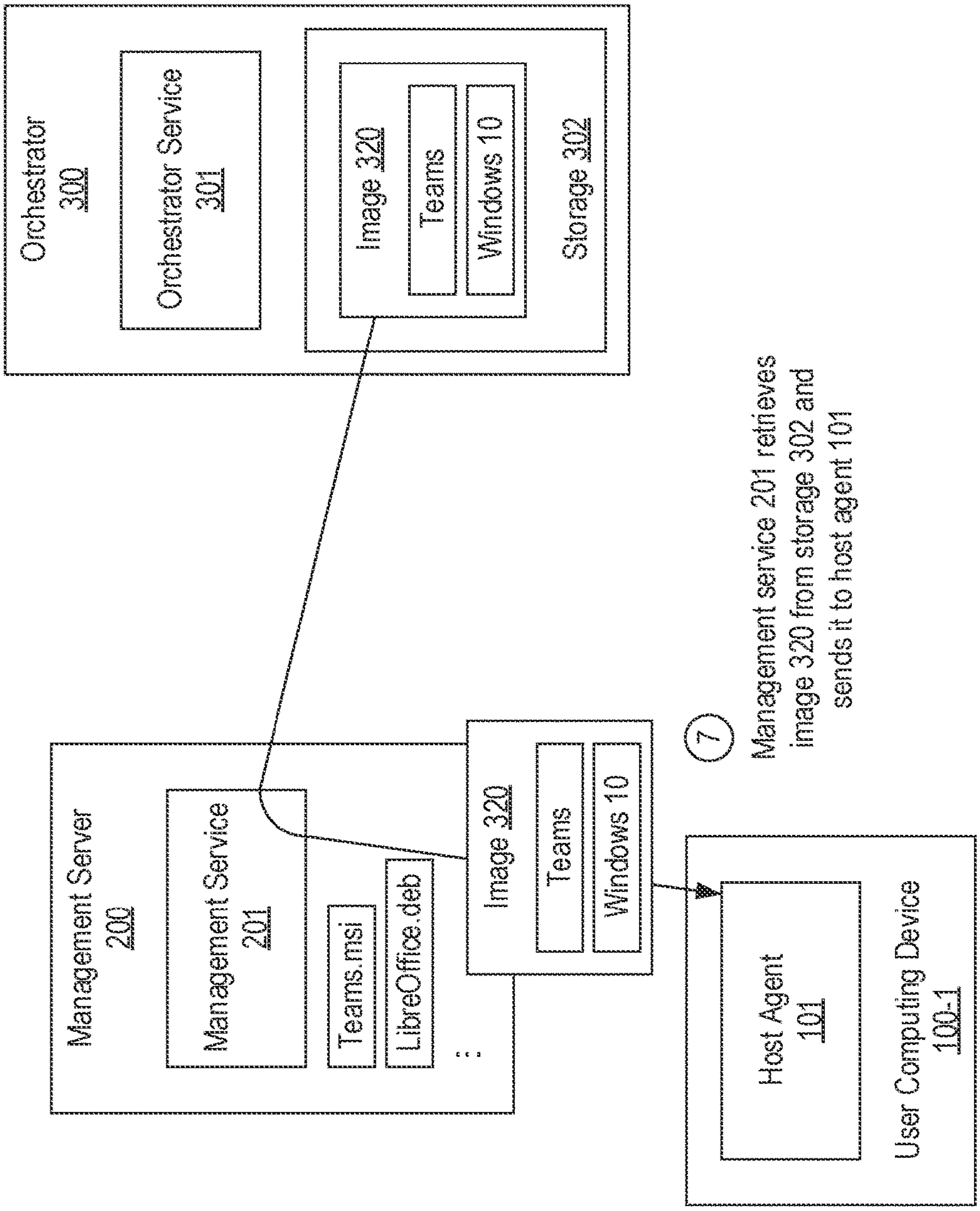

Turning to FIG. 2F, in step 7, management service 201 can retrieve image 320 from storage 302 (or otherwise receive it from orchestrator service 301) and provide image 320 to host agent 101 on user computing device 100-1. Accordingly, in response to the administrator's request to deploy Microsoft Teams in a secure workspace on user computing device 100-1, management service 201 has leveraged orchestrator 300 to create and send image 320 including both Windows 10 and Microsoft Teams to user computing device 100-1.

Figure 2G:
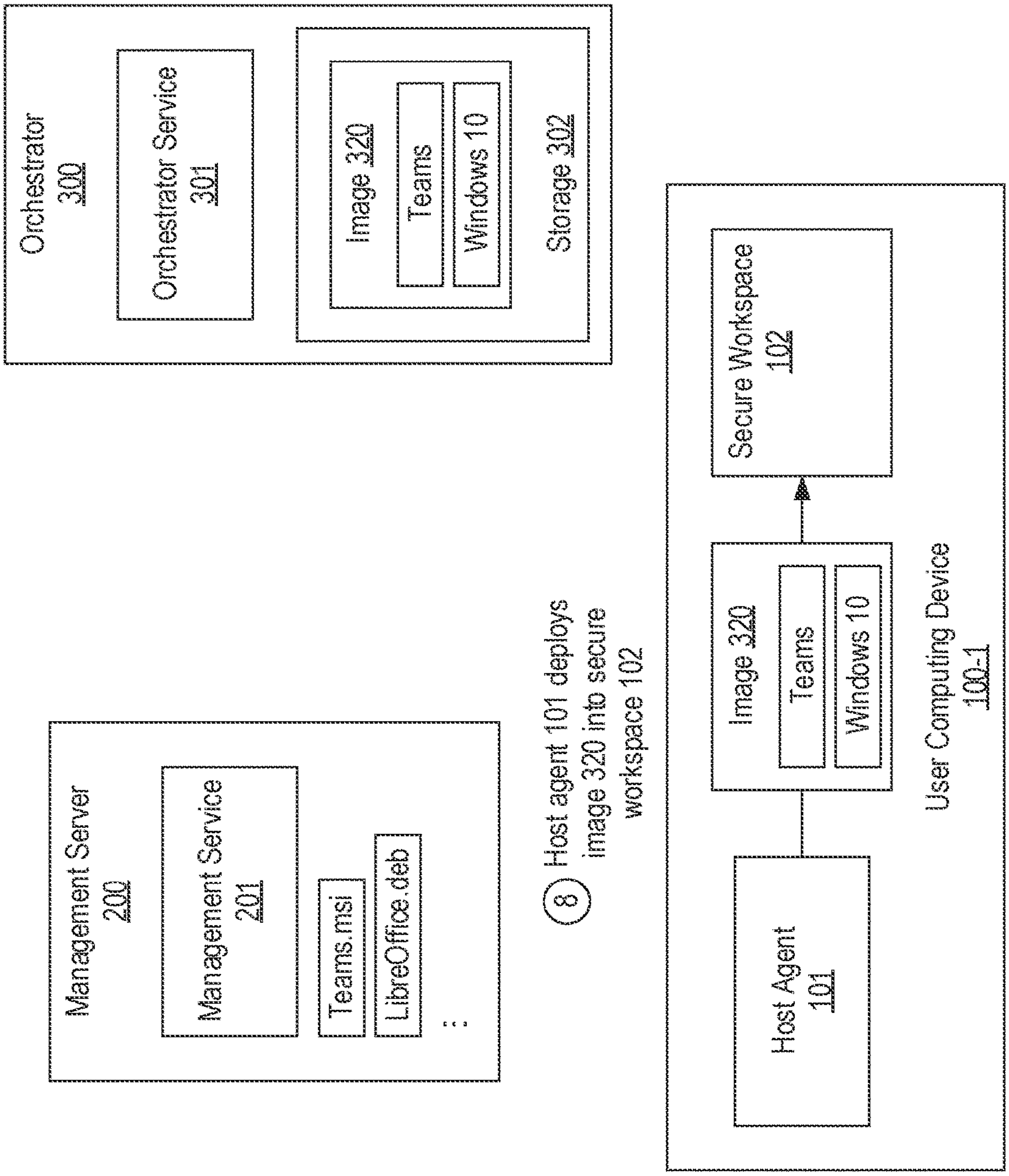

Turning to FIG. 2G, in step 8, host agent 101 can deploy image 320 into secure workspace 102 to thereby cause Microsoft Teams to be hosted in secure workspace 102. Notably, because Microsoft Teams is part of image 320, it is not necessary for the administrator to install Microsoft Teams in secure workspace 102. To the contrary, host agent 101 may only attach image 320 to secure workspace 102.

Steps 7 and 8 could be repeated for any other user computing device 100 on which Microsoft Teams is to be deployed. For example, if the administrator requests that Microsoft Teams be deployed on user computing device 100-2, management service 201 can retrieve image 320 and send it to host agent 101 on user computing device 100-2 which in turn can deploy image 320 in a secure workspace.

Figure 3A:
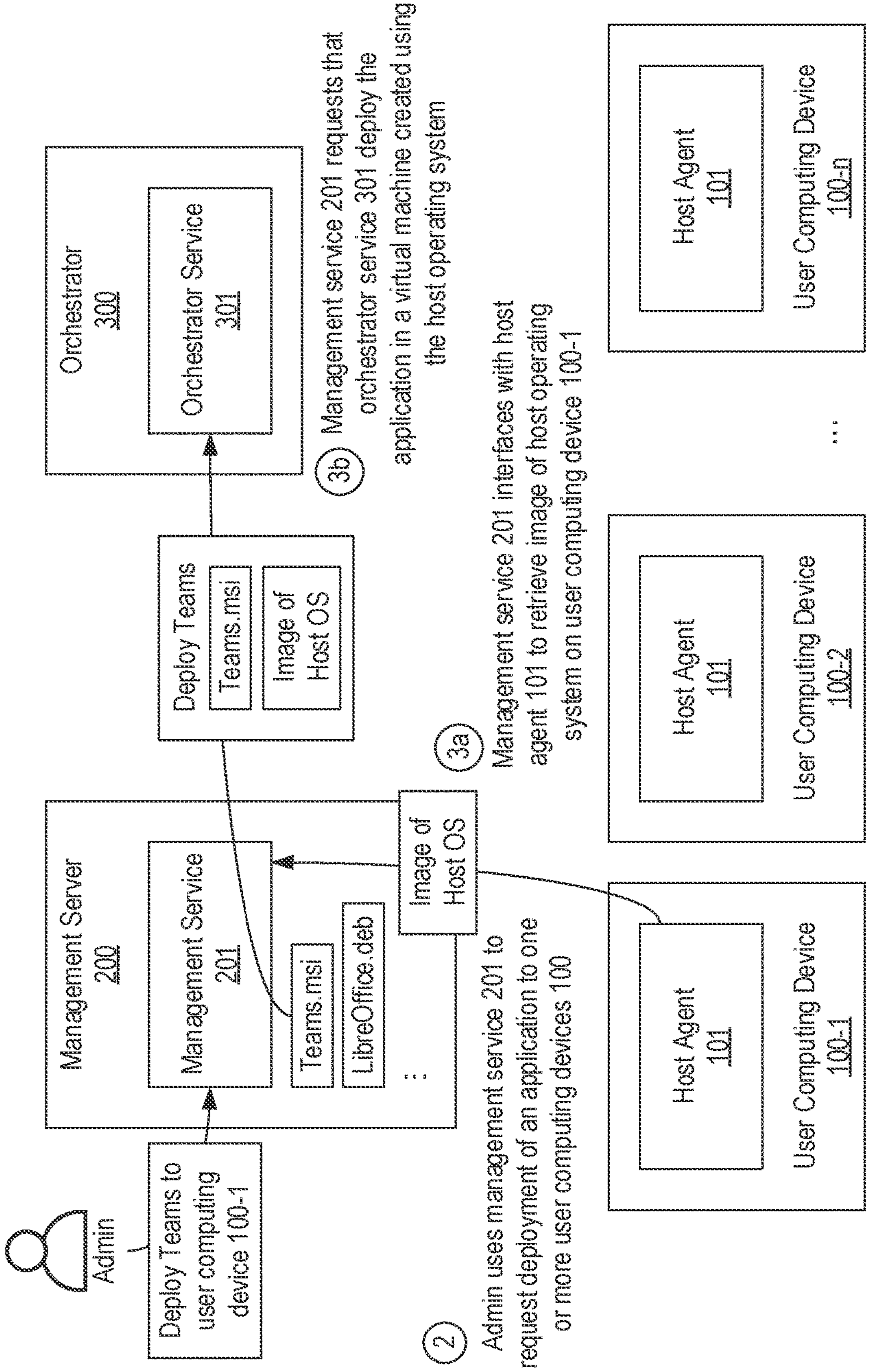
FIGS. 3A and 3B provide an example where an operating system installed on a virtual machine on the orchestrator is obtained from the user computing device to which an application is to be deployed.
Figure 3B:
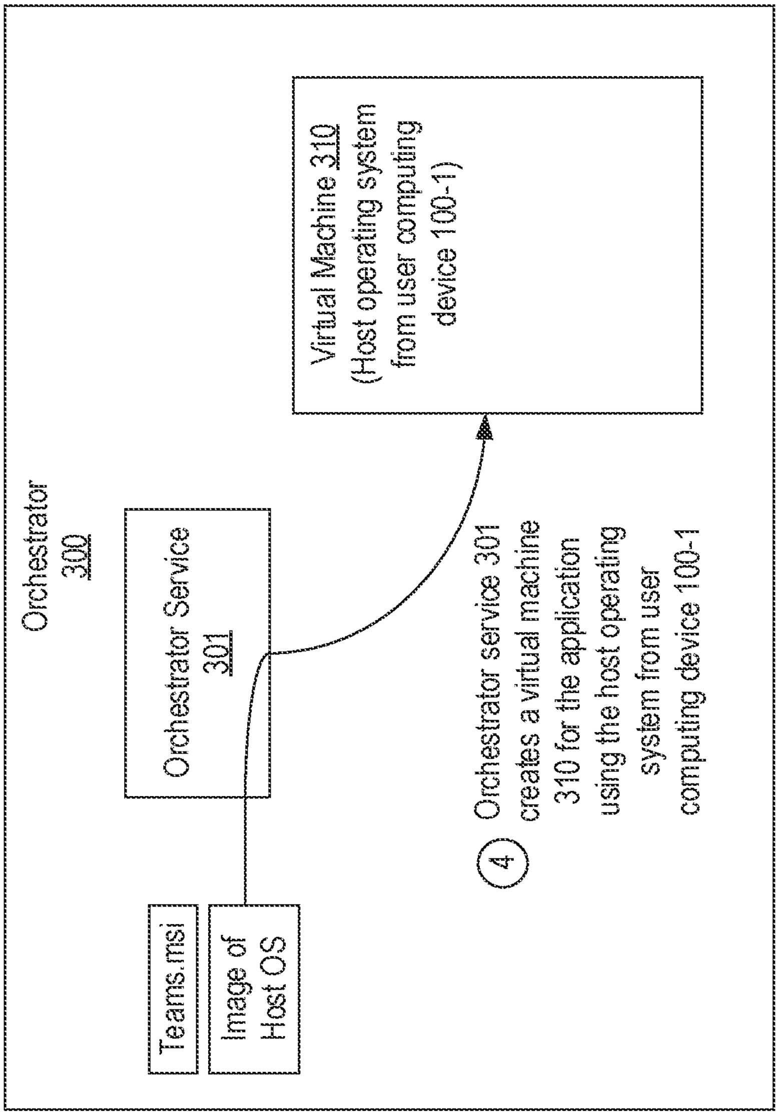

In some embodiments, management service 201 may be configured to obtain an image of the operating system on a user computing device 100 and provide the image of the operating system to orchestrator service 301 for use in creating a virtual machine in which an application can be installed. FIGS. 3A and 3B provide an example of such embodiments.

FIG. 3A is based on FIG. 2B but step 3 has been replaced with steps 3*a* and 3*b*. In step 3*a*, and in response to the administrator requesting that Microsoft Teams be deployed on user computing device 100-1, management service 201 can interface with host agent 101 on user computing device 100-1 to retrieve an image of the host operating system on user computing device 100-1. This host operating system will presumably be licensed for use on user computing device 100-1 and this license status will be reflected in the image. In step 3*b*, management service 201 can request that orchestrator service 301 deploy Microsoft Teams in a virtual machine. However, unlike in step 3 in FIG. 2B, in step 3*b*, management service 201 can send (or otherwise provide access to) the image of the host operating system on user computing device 100-1.

FIG. 3B is based on FIG. 2C except that, in step 4, orchestrator service 301 creates virtual machine 310 using the host operating system from user computing device 100-1. Because virtual machine 310 includes the host operating system from user computing device 100-1, image 320 created from virtual machine 310 will be consistent with the host operating system from user computing device 100-1. For example, image 320 will include an operating system that is already licensed for use on user computing device 100-1 thus eliminating any licensing steps that may otherwise be required when image 320 is deployed to secure workspace 102 on user computing device 100-1.

Figure 4A:
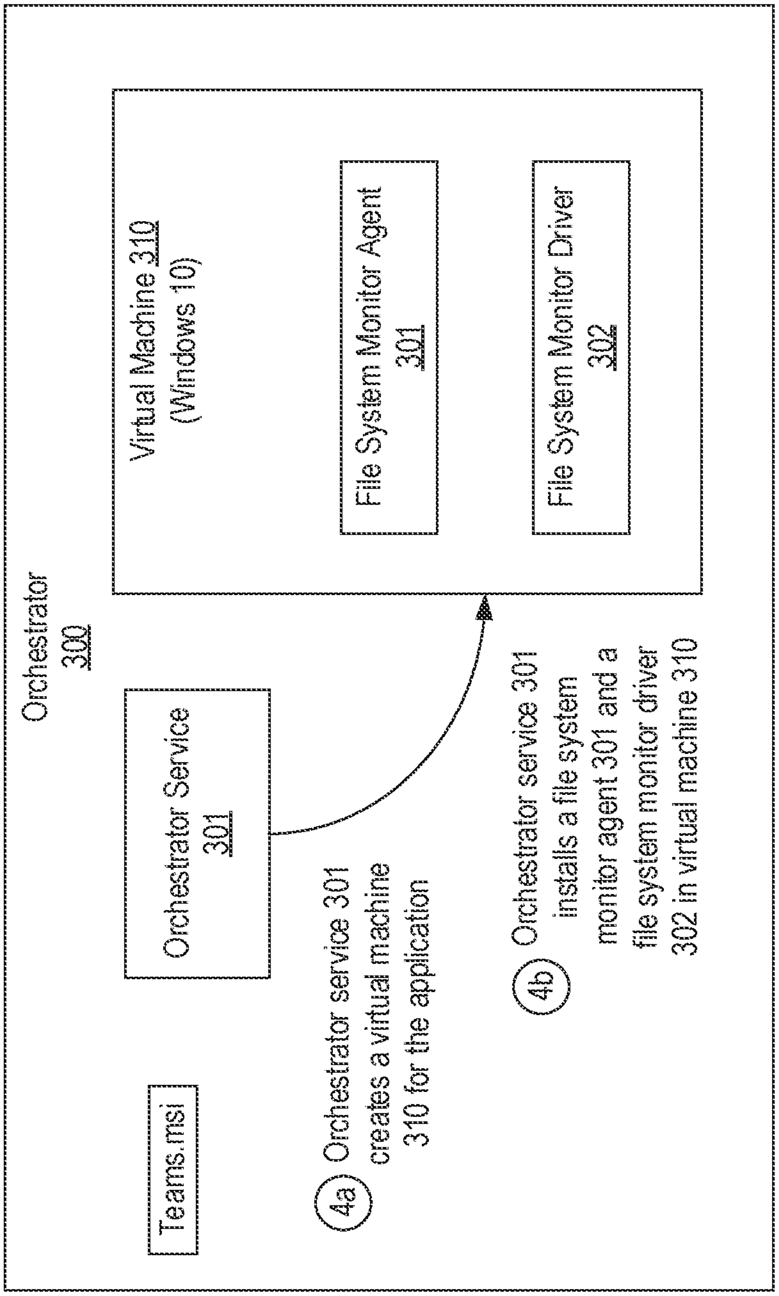
FIGS. 4A-4C provide another example of how smart image preparation for secure workspaces can be implemented in accordance with one or more embodiments of the present invention.
Figure 4B:
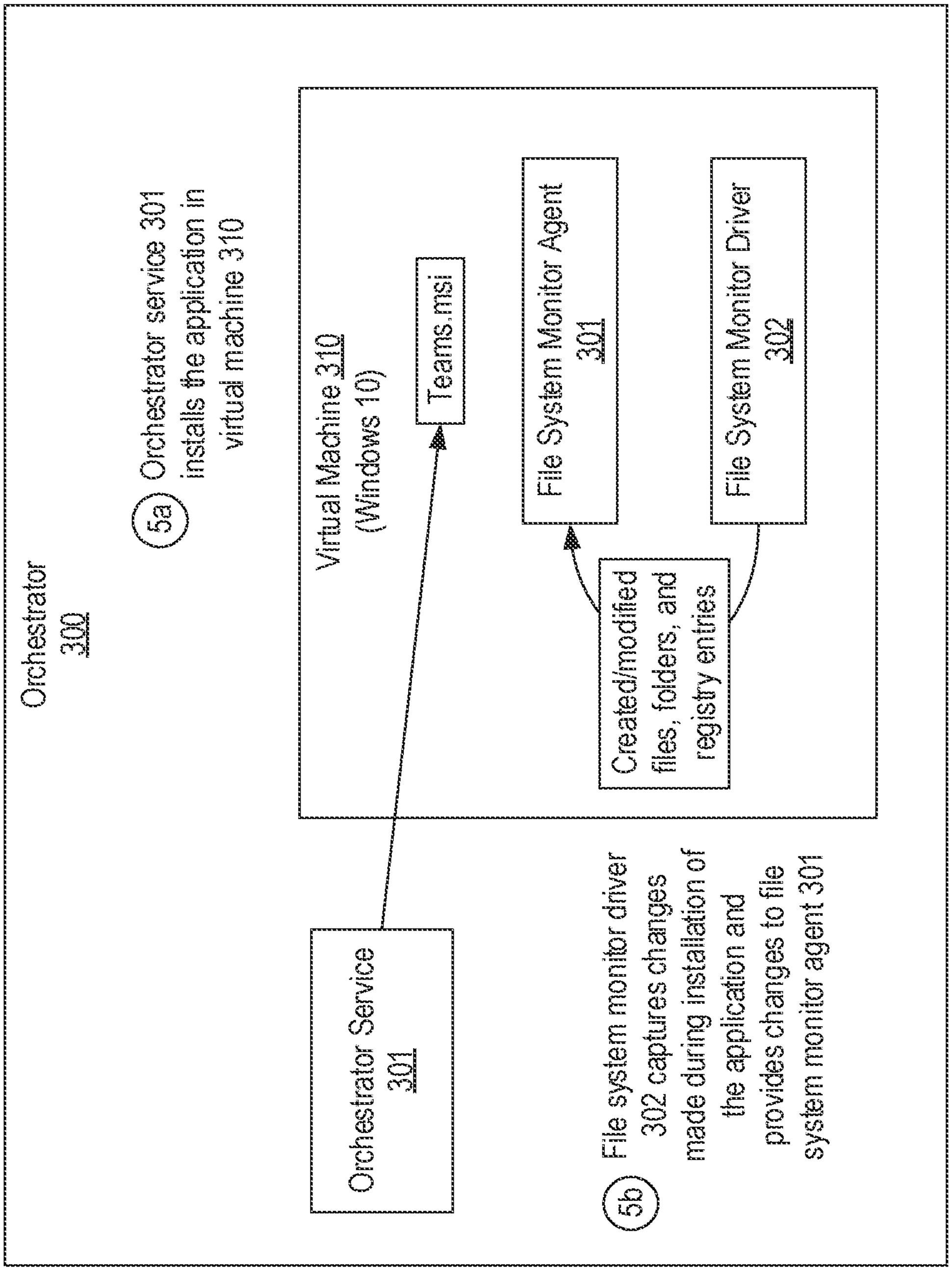
Figure 4C:
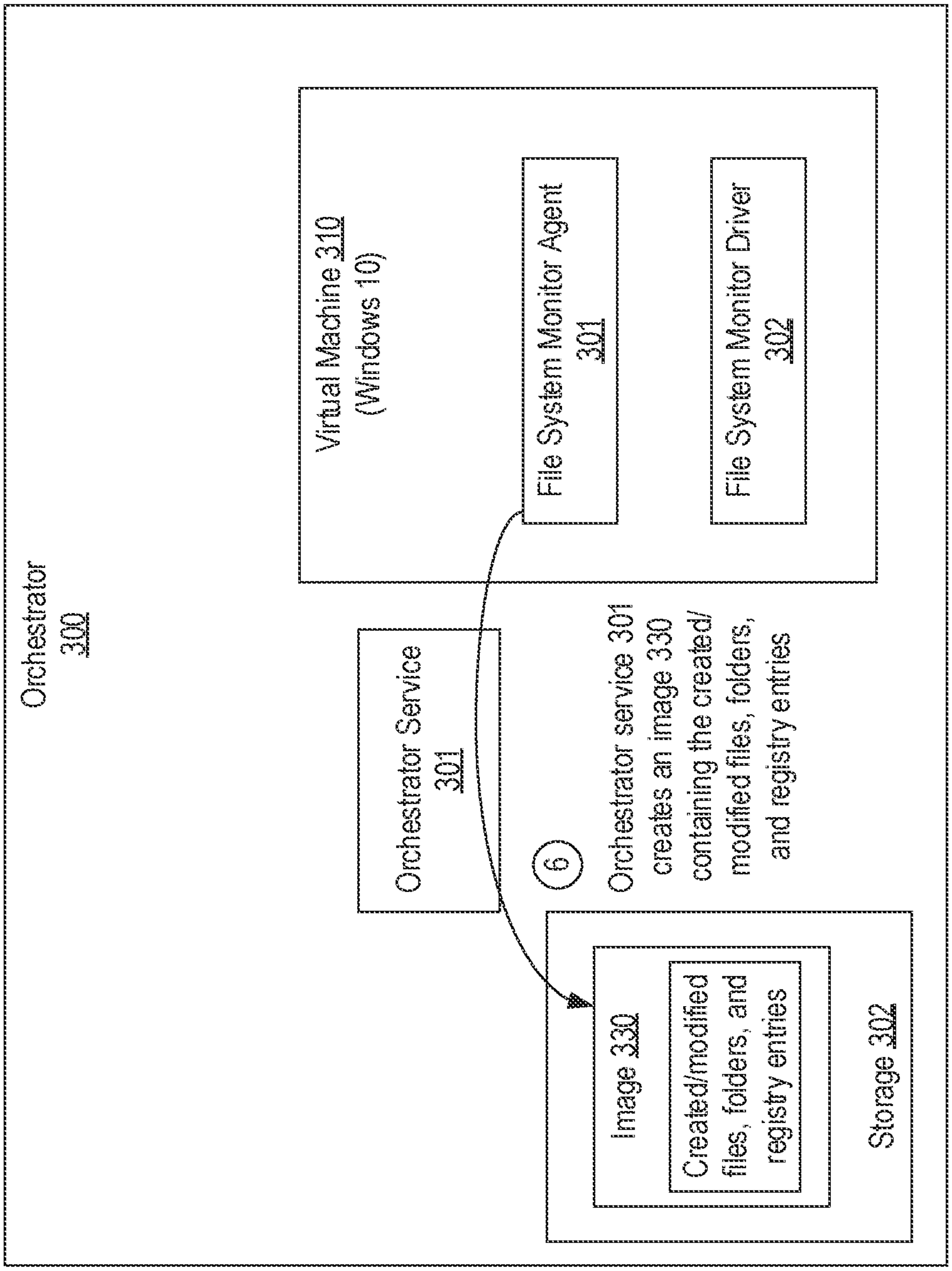

In some embodiments, an administrator may desire to create an image containing only an application to be deployed to a user computing device 100. FIGS. 4A-4C provide an example of how such an image may be created in accordance with embodiments of the present invention.

FIG. 4A is based on FIG. 2C but includes a step 4*a* in which orchestrator service 301 creates virtual machine 310 for the application, which is again Microsoft Teams, and a step 4*b* in which orchestrator service 301 installs a file system monitor agent 311 and a file system monitor driver 312 in virtual machine 310. For example, file system monitor driver 312 could be a filter driver that is loaded below an I/O manager of the operating system so that it can receive I/O requests that are performed during the installation of the application. In some embodiments, file system monitor driver 312 may include both a file system filter driver and a registry filter driver.

Turning to FIG. 4B, in step 5*a*, orchestrator service 301 installs Microsoft Teams on virtual machine 310. In step 5*b*, file system monitor driver 312 can capture changes made during the installation of Microsoft Teams and provide these changes to file system monitor agent 311. For example, file system monitor driver 312 could detect any I/O requests or registry operations that are associated with the installation of Microsoft Teams (e.g., by determining that such requests or operations are associated with a process of Teams.msi) and identify any file or registry entry that is created or modified by the I/O requests or registry operations.

Turning to FIG. 4C, in step 6, orchestrator service 301 can interface with file system monitor agent 311 to create an image 330 containing the file, folders, and/or registry entries that were created or modified during the installation of Microsoft Teams. Accordingly, unlike image 320, image 330 does not include an operating system but includes only the artifacts pertaining to the installed application. Management service 201 could then deploy image 330 to any of user computing devices 100 for attachment to a secure workspace deployed on the user computing device.

In summary, embodiments of the present invention can be implemented to simplify the process of deploying secure workspaces on user computing devices. By merely selecting an application to be installed on a user computing device, the administrator can cause a secure workspace having the appropriate operating system and the application to be deployed on a user computing device.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for smart image preparation for secure workspaces, the method comprising:

receiving, at a management service executing on a management server, a request to deploy an application to a first user computing device;

in response to the request, interfacing with a host agent executing on the first user computing device to retrieve, from the first user computing device, an image of an operating system installed as a host operating system on the first user computing device;

providing the application and the image of the operating system to an orchestrator service executing on an orchestrator;

creating, by the orchestrator service, a virtual machine on the orchestrator using the image of the operating system such that the virtual machine includes an instance of the operating system from the image;

installing the application in the virtual machine;

monitoring, during installation of the application in the virtual machine, changes to a file system of the virtual machine to thereby identify artifacts created or modified by the installation;

creating an image of the virtual machine, the image of the virtual machine including the instance of the operating system from the image, the application, and the artifacts created or modified by the installation;

providing the image of the virtual machine to the host agent executing on the first user computing device; and deploying, by the host agent, the image of the virtual machine to the secure workspace on the first user computing device by attaching the image of the virtual machine to the secure workspace.

2. The method of claim 1, wherein the application is uploaded to the management server before the request is received.

3. The method of claim 1, wherein creating the virtual machine comprises installing the instance of the operating system from the image on the virtual machine.

4. The method of claim 1, wherein the orchestrator service stores the image of the virtual machine and the management service accesses the image of the virtual machine and provides the image of the virtual machine to the first user computing device.

5. The method of claim 1, further comprising:

receiving, at the management service executing on the management server, a second request to deploy the application to a second user computing device;

in response to the second request, interfacing with a second host agent executing on the second user computing device to retrieve, from the second user computing device, a second image of a second operating system installed as a second host operating system on the second user computing device;

providing the application and the second image of the second operating system to the orchestrator service executing on the orchestrator;

creating, by the orchestrator service, a second virtual machine on the orchestrator using the second image of the second operating system such that the second virtual machine includes an instance of the second operating system from the second image;

installing the application in the second virtual machine;

creating a second image of the second virtual machine, the second image of the second virtual machine including the instance of the second operating system from the second image and the application; and providing the second image of the second virtual machine to the second host agent executing on the second user computing device for deployment to a secure workspace on the second user computing device.

6. The method of claim 1, further comprising:

receiving, at the management service, a second request to deploy a second application to a second user computing device;

in response to the second request, providing the second application to the orchestrator service;

creating, by the orchestrator service, a second virtual machine on the orchestrator;

installing a file system monitor agent and a file system monitor driver on the second virtual machine;

during installation of the second application on the second virtual machine, identifying, by the file system monitor driver, artifacts that are created or modified by the installation of the second application;

creating a second image that includes the artifacts; and providing the second image to the second user computing device for deployment to a second secure workspace on the second user computing device.

7. The method of claim 6, wherein the file system monitor driver provides the artifacts to the file system monitor agent.

8. The method of claim 1, wherein the instance of the operating system from the image is already licensed for use on the first user computing device.

9. One or more computer storage media storing computer executable instructions which when executed implement a method for smart image preparation for secure workspaces, the method comprising:

receiving, at a management service executing on a management server, a request to deploy an application to a first user computing device;

in response to the request, interfacing with a host agent executing on the first user computing device to retrieve, from the first user computing device, an image of an operating system installed as a host operating system on the first user computing device;

providing the application and the image of the operating system to an orchestrator service executing on an orchestrator;

creating, by the orchestrator service, a virtual machine on the orchestrator using the image of the operating system such that the virtual machine includes an instance of the operating system from the image;

installing the application in the virtual machine;

monitoring, during installation of the application in the virtual machine, changes to a file system of the virtual machine to thereby identify artifacts created or modified by the installation;

creating an image of the virtual machine, the image of the virtual machine including the instance of the operating system from the image, the application, and the artifacts created or modified by the installation;

providing the image of the virtual machine to the host agent executing on the first user computing device; and deploying, by the host agent, the image of the virtual machine to the secure workspace on the first user computing device by attaching the image of the virtual machine to the secure workspace.

10. The computer storage media of claim 9, wherein the method further comprises:

receiving, at the management service executing on the management server, a second request to deploy the application to a second user computing device;

in response to the second request, interfacing with a second host agent executing on the second user computing device to retrieve, from the second user computing device, a second image of a second operating system installed as a second host operating system on the second user computing device;

providing the application and the second image of the second operating system to the orchestrator service executing on the orchestrator;

creating, by the orchestrator service, a second virtual machine on the orchestrator using the second image of the second operating system such that the second virtual machine includes an instance of the second operating system from the second image;

installing the application in the second virtual machine;

creating a second image of the second virtual machine, the second image of the second virtual machine including the instance of the second operating system from the second image and the application; and providing the second image of the second virtual machine to the second host agent executing on the second user computing device for deployment to a secure workspace on the second user computing device.

11. The computer storage media of claim 9, wherein the method further comprises:

receiving, at the management service, a second request to deploy a second application to a second user computing device;

in response to the second request, providing the second application to the orchestrator service;

creating, by the orchestrator service, a second virtual machine on the orchestrator;

installing a file system monitor agent and a file system monitor driver on the second virtual machine;

during installation of the second application on the second virtual machine, identifying, by the file system monitor driver, artifacts that are created or modified by the installation of the second application;

creating a second image that includes the artifacts; and providing the second image to the second user computing device for deployment to a second secure workspace on the second user computing device.

12. The computer storage media of claim 9, wherein the request is received from an administrator.

13. The computer storage media of claim 9, wherein the method further comprises:

creating the secure workspace on the first user computing device; and attaching the image of the virtual machine to the secure workspace.

14. The computer storage media of claim 9, wherein the orchestrator service stores the image of the virtual machine and the management service accesses the image of the virtual machine and provides the image of the virtual machine to the first user computing device.

15. The computer storage media of claim 9, wherein the method further comprises:

in response to a second request to deploy a second application on a second user computing device, requesting that the orchestrator service install the second application in a second virtual machine;

during the installation of the second application, monitoring artifacts that are created or modified by the installation;

creating a second image that includes the artifacts; and providing the second image to the second user computing device for deployment to a second secure workspace on the second user computing device.

16. The computer storage media of claim 15, wherein the artifacts include files and registry entries.

17. The computer storage media of claim 15, wherein a file system monitor driver is installed in the second virtual machine to monitor the artifacts.

18. A system comprising:

a management server having a management service;

an orchestrator having an orchestrator service; and one or more user computing devices including a first user computing device;

wherein the system is configured to implement a method for smart image preparation for secure workspaces on the one or more user computing devices, the method comprising:

receiving, at the management service, a request to deploy an application to the first user computing device;

in response to the request, interfacing with a host agent executing on the first user computing device to retrieve, from the first user computing device, an image of an operating system installed as a host operating system on the first user computing device;

providing the application and the image of the operating system to the orchestrator service;

creating, by the orchestrator service, a virtual machine on the orchestrator using the image of the operating system such that the virtual machine includes an instance of the operating system from the image;

installing the application in the virtual machine;

monitoring, during installation of the application in the virtual machine, changes to a file system of the virtual machine to thereby identify artifacts created or modified by the installation;

creating an image of the virtual machine, the image of the virtual machine including the instance of the operating system from the image, the application, and the artifacts created or modified by the installation;

providing the image of the virtual machine to the host agent executing on the first user computing device; and deploying, by the host agent, the image of the virtual machine to the secure workspace on the first user computing device by attaching the image of the virtual machine to the secure workspace.

19. The system of claim 18, wherein the method further comprises:

receiving, at the management service executing on the management server, a second request to deploy the application to a second user computing device;

in response to the second request, interfacing with a second host agent executing on the second user computing device to retrieve, from the second user computing device, a second image of a second operating system installed as a second host operating system on the second user computing device;

providing the application and the second image of the second operating system to the orchestrator service executing on the orchestrator;

creating, by the orchestrator service, a second virtual machine on the orchestrator using the second image of the second operating system such that the second virtual machine includes an instance of the second operating system from the second image;

installing the application in the second virtual machine;

creating a second image of the second virtual machine, the second image of the second virtual machine including the instance of the second operating system from the second image and the application; and providing the second image of the second virtual machine to the second host agent executing on the second user computing device for deployment to a secure workspace on the second user computing device.

20. The system of claim 18, wherein the method further comprises:

receiving, at the management service, a second request to deploy a second application to a second user computing device of the one or more user computing devices;

requesting that the orchestrator service installs the second application in a second virtual machine on the orchestrator;

during installation of the second application, monitoring artifacts that are created or modified by the installation;

creating a second image that includes the artifacts; and providing the second image to the second user computing device to cause the second image to be attached to a second secure workspace on the second user computing device.

* * * * *